J. E. EARLE.
Mathematical Dividers.
No. 19,058. Patented Jan'y 5, 1858.
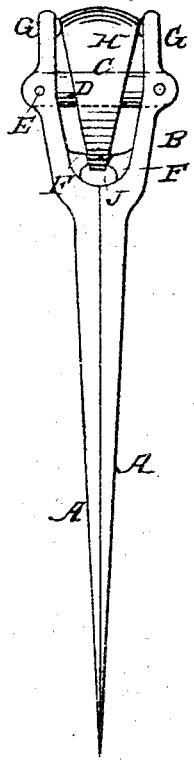
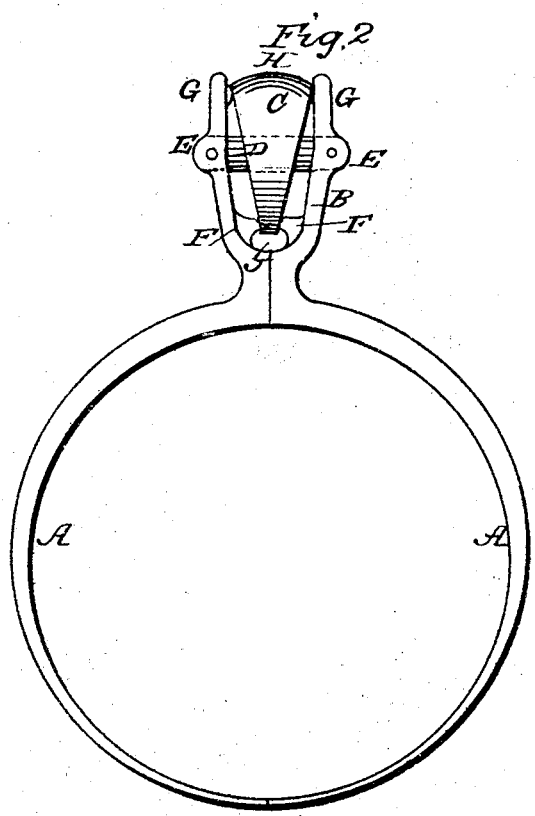
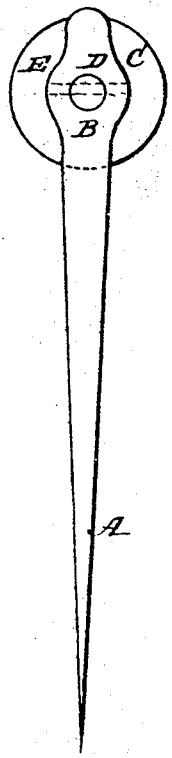

UNITED STATES PATENT OFFICE.

JOHN E. EARLE, OF LEICESTER, MASSACHUSETTS, ASSIGNOR TO HIMSELF, AND SAMUEL SHEPHERD, OF NASHUA, NEW HAMPSHIRE.

MATHEMATICAL DIVIDERS.

Specification of Letters Patent No. 19,058, dated January 5, 1858.

*To all whom it may concern:*

Be it known that I, JOHN E. EARLE, of Leicester, county of Worcester, and State of Massachusetts, have invented certain new and useful Improvements in Compasses, Dividers, or Calipers; and I do hereby declare that the following is a full, clear, and exact description thereof, reference being had to the accompanying drawings, making a part thereof, in which—

Figure 1 represents a pair of compasses or dividers. Fig. 2, represents a pair of calipers. Fig. 3, represents a side view of the same.

Same letters refer to like parts.

The nature of my invention relates to the method of opening, closing and holding the legs of dividers or calipers.

The lower extremities of the legs A, A may be straight or curved as may best serve the purpose to which they are to be applied, the upper parts B, B, being so formed as to receive the circular inclined plane C by which the legs are operated. The spindle or axle D which passes through the inclined plane C, connects the legs B, B, by pins E, E. The inclined plane C, turns upon the axle D, and having bearings upon the legs B, B, at the points F, F, and G, G. Consequently when the inclined plane C, is turned upon the axle D, and the highest part H is brought nearer the points F, F, and the lowest or thinnest part I toward the points G, G, the extremities A, A, will be forced apart and remain in any desired position and in like manner to open or close the extremities A, A, according as the inclined plane may be turned.

The form of these several parts may be modified or changed without changing the general principles of the instruments, and I do not confine myself to the precise arrangement represented, reserving the right to modify so long as I do not depart from the general construction of the instrument.

Having thus fully described the nature of my invention, what I claim therein as new and useful and desire to secure by Letters Patent is—

Operating compass-dividers or calipers by means of a circular revolving cam, substantially as described.

JOHN E. EARLE.

Witnesses:
OLIVER D. SEYMOUR,
J. S. CURTIS.